United States Patent Office 3,382,710
Patented May 14, 1968

---

3,382,710
TORQUE-MEASURING DEVICES
René Aubeges, Saint-Ouen, and Antoine Agostini, Maisons-Laffitte, France, assignors to Societe Anonyme Simca Automobiles, Paris, France
Filed July 14, 1965, Ser. No. 471,882
Claims priority, application France, July 16, 1964, 981,816, Patent 1,409,795
5 Claims. (Cl. 73—135)

ABSTRACT OF THE DISCLOSURE

A device for connecting to the rotatable spindle of a screw tightening machine to measure the torque output thereof, including a driving member supported in a casing and adapted to engage the rotatable spindle by means of clutch means so that a flexible strut secured to a portion of the driving means is deformed in response to the torque applied by the rotating spindle.

---

The present invention relates to torque-measuring devices, particularly for measuring the torque of a screw-tightening machine.

At the present time, in the mechanical industry, screwing machines are used, having multiple spindles driven by compressed air turbines and which enable a correct tightening of the nuts or screws to be obtained. However, it is necessary to keep the torque load constant and, to this end, it is quite often necessary to control this torque and, if desired, to adjust it.

However, up to the present time, the torque adjustment has had to be carried out with the machine stopped, causing considerably long interruptions of operation and preventing correct adjustment of the torque load.

It is therefore an object of the present invention to enable the torque load of such a nut-runner or other screw-tightening machine to be measured and adjusted during operation. It is a further object to be able to mount the device directly on the machine at the operating station to enable rapid measurements, avoiding loss of time, to be made. It is a further object to allow the reaction of the torque load to be absorbed by an extension piece on the machine and effect the measurements by deforming a flexible pre-calibrated strut, this deformation being recorded by a displacement measuring member, particularly a comparator. The result of the measurements obtained by the comparator is then compared with the deformations of the strut recorder under test and corresponding to specific amount of torque.

The present invention consists in a torque measuring device comprising a sleeve or like member securable to an extension of a screw-tightening machine, said sleeve carrying a casing in which is arranged a clutch member for coupling a rotatable spindle of said machine to a driving member secured to or integral with a flexible strut, the axis of which is perpendicular to the axis of rotation of said driving member, said strut having one of its ends held between two fixed points carried within the casing and the other end in contact with a measuring member for recording the deformations of said strut.

Figure 1:
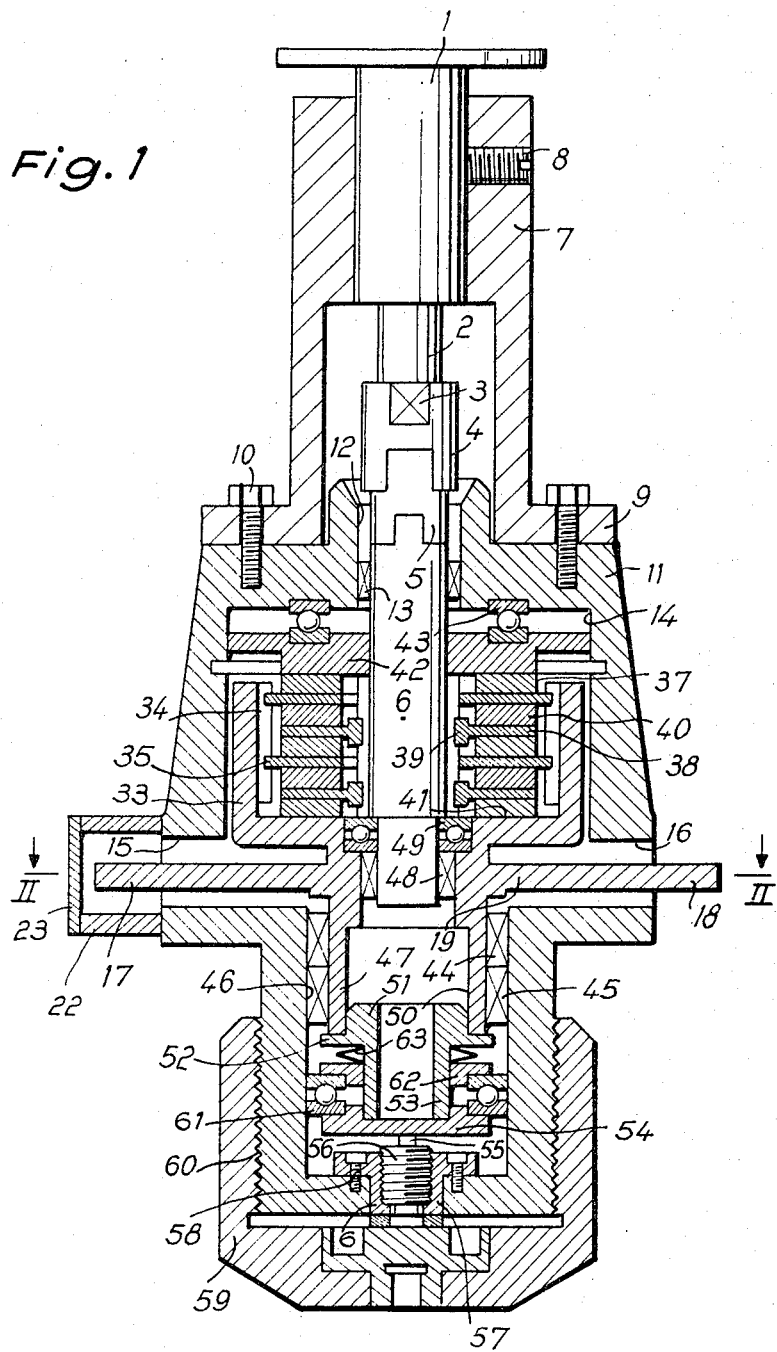
Figure 2:
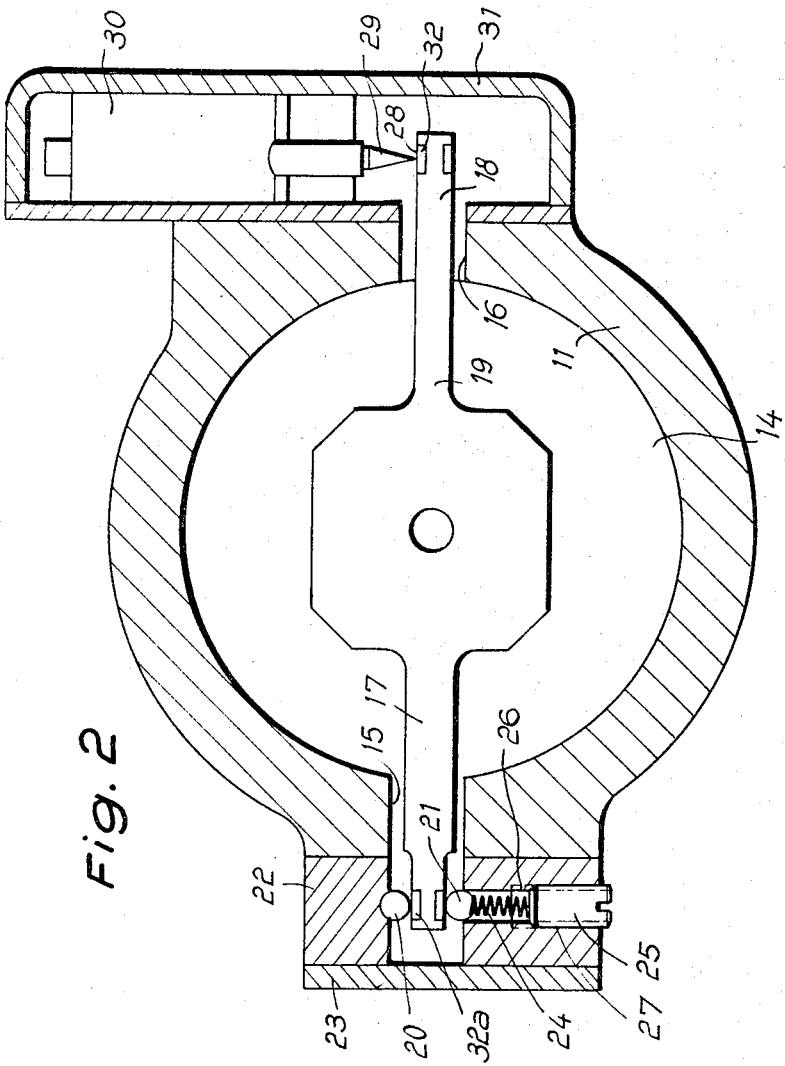

Other advantageous characteristics of the invention will become apparent from the following description of one embodiment given solely by way of example, this description referring to the accompanying drawings in which:

FIGURE 1 shows a longitudinal sectional view of a torque measuring device according to the invention mounted on a screwing machine, and FIGURE 2 shows a sectional view of the device of FIGURE 1 along the line II—II thereof.

Referring to the drawings, FIGURE 1 shows an extension 1 of a nut-runner or other screw-tightening machine, in which is rotatably mounted a spindle 2 having at its end a driving square 3 on which is fixed a screwing ferrule 4 in which is engaged a connection adaptor 5, inserted between the spindle 2 and a half-spindle 6 extending the spindle 2 and rotatable therewith. A sleeve 7, engaged on the extension 1 and fixed thereto by a set screw 8, has on its lower part a shoulder 9 on which is fixed a casing 11 of a measuring device according to the invention, by means of screws 10. This casing 11 has on its upper part a bore 12 through which the half-spindle 6 mounted on a bearing 13 axially extends into a chamber 14 of said casing.

In the median part of the casing 11 are provided symmetrical openings 15, 16 in which the ends 17, 18 of a flexible strut 19 are arranged, said strut being precalibrated, e.g. in a test laboratory, before assembly (FIGS. 1 and 2). The strut 19 is held by its end 17 between two ball bearings 20, 21 supported on a detachable part 22 which is fixed on the casing 11 and closed by a cover 23. The ball bearing 21 is subjected to the action of a spring 24, the tension of which is regulated by a screw 25 mounted in a hole 26 receiving the spring 24 and the end 27 of which is threaded. The end 18 of the strut 19 is supported on one of its faces 28 against the tip or feeler 29 of a comparator 30 arranged in a housing 31 fixed on the casing 11.

The parts of the strut 19 which are in contact with the tip or feeler 29 of the comparator or with the ball bearings 20 and 21 are provided with detachable tablet-shaped members 32, 32a, having a hardness greater than the material of the strut itself.

In its median part, the strut 19 is extended at its upper part by a dished driving member 33, extending into the chamber 14, and having splines 34 which cooperate with corresponding external grooves of discs 35 being part of a clutch 37 which also comprises discs 38 securable by splines 39 to the half-spindle 6. Friction discs 40 are alternately arranged between the discs 35 and 38 and ensure the driving of the member 33 by the half-spindle 6 when the stack of discs is compressed between the base of the dish 41 of the member 33 and a plate 42 supported on the casing 11 by a thrust bearing 43.

The strut 19 and its driving member 33 are pivotally mounted by a hollow tail-shaft 47 on bearings 44, 45 fixed in a second lower chamber 46 of the casing 11.

The half-spindle 6 is rotatably mounted in the strut 19 by a bearing 48 and a ball thrust bearing 49.

At the end of the tail-shaft 47 a head of a plunger 51 which is supported by a flange 52 on the tail-shaft 47, is housed in a chamber 50 of the latter. The cylindrical part 53 of this plunger 51 rests on a plate 54, in abutment against a teat 55 of an adjusting screw 56 screwed into a threaded sleeve 57 fixed on the casing 11 by means of screws 58, and capable of being pushed back against the plate 54 by a threaded button 59, screwed on the lower part of the casing 11 which has a thread 60.

The plate 54 has a centring thrust bearing 61 mounted to slide into the chamber 46, said thrust bearing supporting a ring 62 engaged on the cylindrical part 53 of the plunger, flexible dish-shaped washers 63 being arranged between the flange 52 of the plunger 51 and the ring 62.

In order to measure a torque on a nut-runner or other screw-tightening machine, the device according to the invention is mounted on the extension 1 of the machine by means of the sleeve 7, having engaged the connection adaptor 5 in the ferrule 4 of the spindle 2. Then, the machine is put into operation, the spindle 2 rotating the half-spindle 6 which freely rotates in its bearings 13 and 48. The button 59 is screwed on the casing 11 so that it rotates the screw 56 which is displaced in the sleeve 57 and thus pushes the plate 54 as well as the plunger 51 in an upward direction. For its part, the plunger 51 supported on the tail-shaft 47 pushes back the flexible strut 19 and its driving member 33 by compressing the stack of discs 35, 38 and 40 between the plate 42 and the base 41 of the driving member 33. The compression of the clutch discs 37 ensures the coupling of the half-spindle 6 and the driving member 33 of the strut 19. The strut 19 subjected to the rotational torque undergoes a deformation detected by the comparator 30 and which may be read on its dial.

It is then sufficient to compare the result of the reading with the curve of the deflections as a function of the torque, established during the preliminary testing and calibration of said strut, in order that the value of the torque may be ascertained.

If the torque does not correspond to the desired value, the turbine of the machine is regulated and a new measurement is carried out as indicated previously until the desired torque is obtained.

The device described and shown is particularly applicable to a nut-runner or other screw-tightening machine, but it is to be understood that it could equally well be applied to any similar machine having a rotatable spindle, the torque of which it is desired to measure.

We claim:

1. A measuring device adapted to be connected to a rotatable member of a machine to measure the torque output thereof, said device comprising a casing, means to attach said casing to the frame of said machine, driven means supported in said casing and positively engaging said rotatable member, a reaction member rotatably mounted in said casing, brake means, means to move said brake means into and out of a position whereby it couples said driven means and said reaction member, a flexible strut rigidly secured to said reaction member, engaging means mounted on said casing and engaging one end of said flexible strut to restrain same from movement, and measuring means mounted on said casing in contact with the other end of said strut and responsive to movements thereof to measure the torque applied to said driven means.

2. A torque measuring device according to claim 1, wherein said measuring means comprises a feeler in contact with said other end of said strut and a dial indicator to register movements of said feeler.

3. A torque measuring device according to claim 1, wherein said engaging means is in the form of two bearings carried by said casing, spring means acting on one of said bearings, and screw means for regulating the tension of said spring means.

4. A torque measuring device according to claim 1, further comprising a plate member supported on said driven means, and thrust bearing means disposed between said plate member and said casing; and wherein said brake means comprises a plurality of cooperating friction discs disposed between said reaction member and said plate member.

5. A torque measuring device according to claim 4, wherein said means for moving said brake means comprises a threaded button screwed on one end of said casing, a screw member axially movable in said casing in response to rotation of said button, a plunger operatively connecting said screw member and said reaction member, and spring means disposed between said plunger and screw member, so that axial movement of said screw member displaces said reaction member and compresses said discs between said reaction member and said plate member.

References Cited

UNITED STATES PATENTS

| | | | |
|---|---|---|---|
| 2,111,801 | 3/1938 | Olsen | 73—135 |
| 2,795,131 | 6/1957 | Booth | 73—1 |
| 2,803,133 | 8/1957 | Casady et al. | 73—139 |
| 3,312,105 | 4/1967 | Amtsberg. | |

FOREIGN PATENTS

| | | |
|---|---|---|
| 993,088 | 7/1951 | France. |

JAMES J. GILL, *Primary Examiner.*

RICHARD C. QUEISSER, *Examiner.*

J. H. WILLIAMSON, *Assistant Examiner.*